(12) United States Patent
Williams et al.

(10) Patent No.: US 9,475,375 B1
(45) Date of Patent: Oct. 25, 2016

(54) WEATHER STRIP FOAM RETENTION FEATURE

(71) Applicant: Toyota Motor Engineering & Manufacturing North America, Inc., Erlanger, KY (US)

(72) Inventors: Paxton S. Williams, Milan, MI (US); Barugur S. Balasundaramohan, Troy, MI (US); Nicholas H. Augustyn, Ypsilanti, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/684,633

(22) Filed: Apr. 13, 2015

(51) Int. Cl.
*E05D 15/16* (2006.01)

(52) U.S. Cl.
CPC ............... *B60J 10/33* (2016.02); *B60J 10/27* (2016.02); *B60J 10/50* (2016.02); *B60J 10/74* (2016.02)

(58) Field of Classification Search
CPC .......... B60J 10/33; B60J 10/74; B60J 10/27; B60J 10/50
USPC .................................................... 49/440, 441
See application file for complete search history.

(56) References Cited

U.S. PATENT DOCUMENTS

| | | | |
|---|---|---|---|
| 3,333,381 A * | 8/1967 | Batz et al. ............... | 52/204.597 |
| 3,338,015 A | 8/1967 | Hoverman | |
| 3,672,109 A | 6/1972 | Erck | |
| 4,064,654 A | 12/1977 | Olson | |
| 4,447,065 A * | 5/1984 | Dupuy et al. ................ | 277/642 |
| 4,461,507 A * | 7/1984 | Minami et al. ............... | 296/76 |
| 4,474,402 A * | 10/1984 | Shelton .......................... | 296/76 |
| 4,653,166 A * | 3/1987 | Bright ............................. | 29/235 |
| 4,880,674 A * | 11/1989 | Shimizu ........................ | 428/31 |
| 5,050,349 A * | 9/1991 | Goto et al. .................... | 49/489.1 |
| 5,423,147 A * | 6/1995 | Dupuy .......................... | 49/490.1 |
| 5,456,049 A * | 10/1995 | Goto et al. .................... | 52/208 |
| 5,752,352 A * | 5/1998 | Goto et al. .................... | 52/208 |
| 5,826,378 A * | 10/1998 | Gallas ........................... | 49/498.1 |
| 5,840,401 A * | 11/1998 | Baesecke ....................... | 428/122 |
| 7,410,203 B2 * | 8/2008 | Yatsuda et al. ............. | 296/146.2 |
| 7,685,777 B2 * | 3/2010 | Nozaki et al. ............... | 49/498.1 |
| 7,735,263 B2 * | 6/2010 | Oba et al. ..................... | 49/490.1 |
| 8,001,728 B2 * | 8/2011 | Shibata et al. ............... | 49/489.1 |
| 8,595,982 B2 * | 12/2013 | Matsuura et al. ............. | 49/441 |
| 8,793,937 B2 | 8/2014 | Otsuka et al. | |
| 9,151,107 B2 * | 10/2015 | Kaczmarczyk et al. | |
| 2001/0001916 A1 * | 5/2001 | Nozaki ........................... | 49/414 |
| 2006/0162257 A1 * | 7/2006 | Nozaki et al. ............... | 49/490.1 |
| 2006/0248802 A1 * | 11/2006 | Tamaoki et al. ................ | 49/441 |
| 2007/0089371 A1 * | 4/2007 | Krause ........................... | 49/441 |
| 2008/0238137 A1 | 10/2008 | Kobayashi et al. | |
| 2014/0128490 A1 | 5/2014 | Kijima | |

* cited by examiner

*Primary Examiner* — Jerry Redman
(74) *Attorney, Agent, or Firm* — Dinsmore & Shohl LLP

(57) ABSTRACT

A weather strip is provided adapted to connect to a door frame and a window. The weather strip includes a cavity adapted to mechanically secure at least a portion of foam within a cavity of the weather strip. In one embodiment, a retainer is provided within the cavity to secure the foam within the cavity.

20 Claims, 3 Drawing Sheets

WEATHER STRIP FOAM RETENTION FEATURE

FIELD OF THE INVENTION

The present apparatus relates generally to a weather strip for use with a vehicle window. More particularly, the present apparatus relates to a weather strip having a retention feature adapted to hold foam in place.

BACKGROUND

Weather stripping is commonly provided between a window and a door frame on a vehicle. The weather strip acts as a seal to keep water and air out of the vehicle cabin. It is further common to provide insulation within the weather strip to prevent noise intrusion within the vehicle cabin. It is common to use a mastic material in the weather strip as a means for preventing noise intrusion. However, liquid mastic is messy and can easily contaminate the weather strip or get on the gloves or clothes of the installer. Liquid mastic is difficult to clean up and often requires scraping of parts after installation.

Foam is also an alternative means to prevent noise intrusion. However, the only current means for installing foam require some sort of adhesive, such as double-sided tape or glue, to keep the foam in place. This means of installation is not desirable since it requires significant bending of the weather strip which frequently results in the deformation of parts which may result in decreased performance. Furthermore, the deformation of the weather strip may also result in an undesirable appearance of the weather strip.

Accordingly, there exists a need in the art to provide a weather strip having a means to prevent noise intrusion which overcomes the disadvantages enumerated above.

SUMMARY

A weather strip for a window in a vehicle includes an elongated foam member for reducing noise. The weather strip includes a cavity adapted to mechanically secure at least a portion of foam member within a cavity of the weather strip. In one embodiment, a retainer is provided within the cavity to secure the foam within the cavity.

The weather strip includes a main body configured to accept a portion of the window. A lip is provided extending away from the main body. The lip is adapted to connect with the door frame. A cavity is formed between the main body and the lip. The cavity is configured to secure a piece of foam within the cavity to prevent noise intrusion heard within the vehicle. The retainer is provided within the cavity and is adapted to abut a portion of the foam to hold the foam in place within the cavity.

The retainer within the cavity extends away from an inner wall within the cavity. In one embodiment, the retainer extends slightly towards the foam when the foam is in an installed position. The retainer is flexible and adapted to accommodate the installed foam. The retainer is integrally formed into the weather strip thus resulting in a one piece assembly of the retainer and the weather strip portions. A door assembly for a vehicle is further provided having a door frame, a window contained within the door frame, and a weather strip mounted between the door frame and the window. The weather strip includes a cavity adapted to mechanically secure a portion of the foam within the cavity thereby reducing noise heard within the vehicle. In this embodiment, a retainer is provided within the cavity to mechanically secure the foam within the cavity. The retainer extends from an inner wall within the cavity. The retainer extends generally orthogonally into the cavity with respect to the inner wall of the cavity.

BRIEF DESCRIPTION OF THE DRAWINGS

FIG. 6 illustrates a tool adapted for installing the foam within the weather strip.

DETAILED DESCRIPTION OF THE PREFERRED EMBODIMENTS

A foam member is provided within a cavity of a weather strip to prevent noise intrusion within the cabin of the vehicle. The weather strip is provided having the cavity adapted to mechanically secure a portion of foam within the cavity. The foam is secured by means of at least one retainer extending towards the center portion of the cavity away from an inner wall of the cavity. The retainer is adapted to at least partially abut the foam and thus mechanically secure the foam in place within the cavity.

Figure 1:
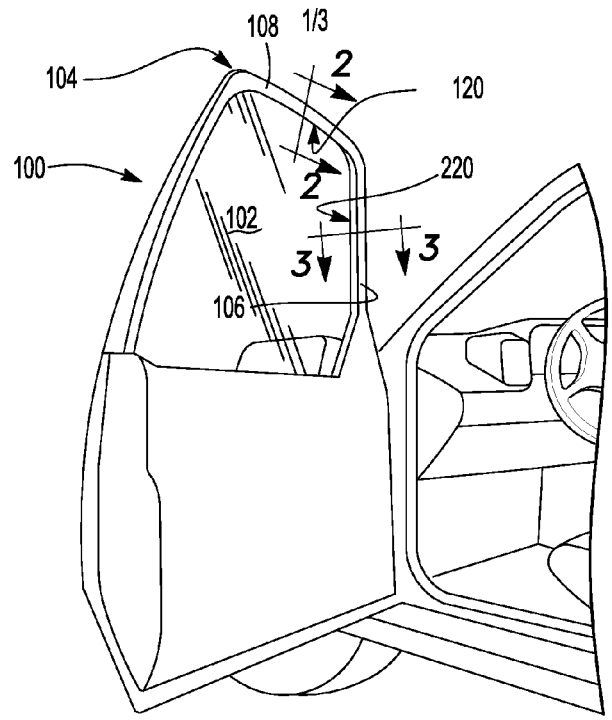
FIG. 1 illustrates a perspective view of a vehicle having a door with the installed weather strip.

As shown in FIG. 1, a vehicle door 100 includes a window 102 and a door frame 104. The door frame 104 includes a side portion 106 and an upper portion 108. The weather strip, which will be discussed in the following, is installed into the side portion 106 and the upper portion 108 of the door frame 104. The weather strip is generally elongated and adapted to fit within the door side portion and within the upper portion 108. The upper portion 108 may include a slightly different weather strip configuration as compared to the weather strip installed in the side portions. In one embodiment, the weather strip portions are separate. Alternatively, the weather strip is a continuous piece extending along the interior perimeter of the window.

It should be appreciated that the weather strip of the present embodiment may be used in any vehicle configuration where a window is provided, not just a door frame such as in the present embodiment.

Figure 2:
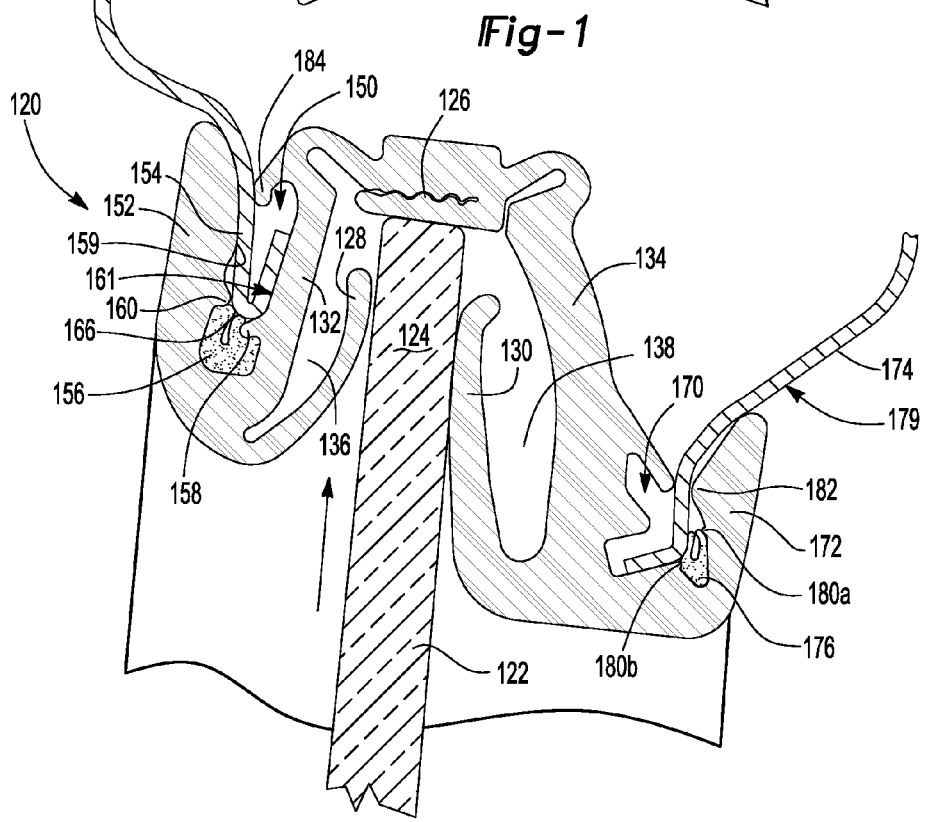
FIG. 2 illustrates a cross-sectional view along the line 2-2 of FIG. 1 illustrating the retainers within the cavity of the weather strip.
Figure 3:
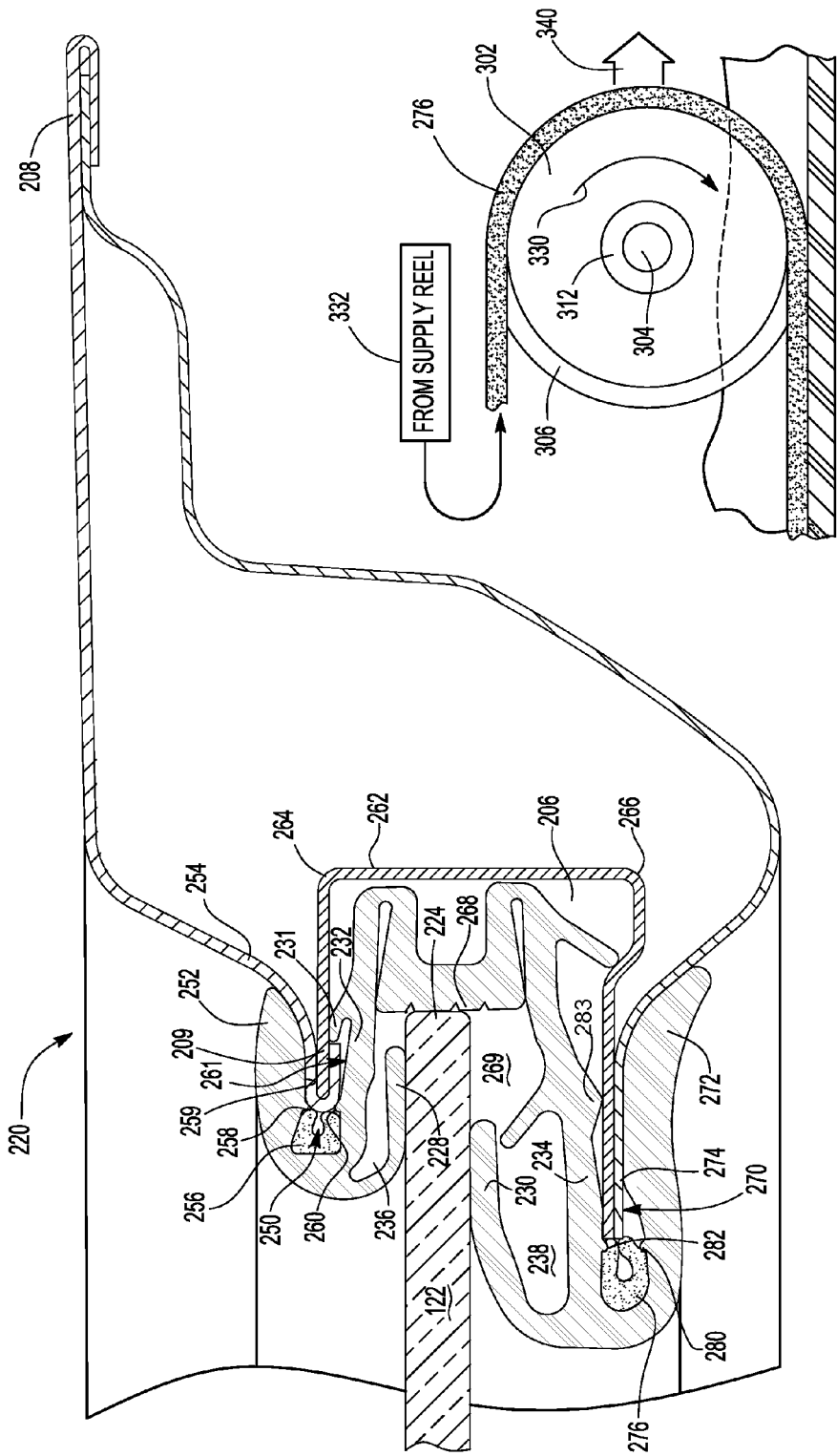
FIG. 3 illustrates a cross-sectional view along the line 3-3 of FIG. 1 illustrating the foam in an installed position.

The cross-sectional views of FIGS. 2 and 3 illustrate various embodiments of the positioning of retainers within a cavity of the weather strip. A weather strip 120 is provided within the upper portion 108. A cross-sectional view of the weather strip 120 is shown in FIG. 2. The weather strip 120 includes main body portions 132, 134 with lip portions 152, 172 extending therefrom. Cavities 150, 170 are created between the main body portions 134, 132 and the lip portions 152, 172. In one embodiment, a portion of the door frame 154 extends partially within the cavity 150. The door frame 150 slightly pivots the lip 152 away from the main body portion 132 of the weather strip. Before the door frame 154 is installed, a foam portion 156 is installed into the cavity 150. The foam portion 156 is positioned into the deepest portion of the cavity 150. The foam portion 156 is held in place by means of two retainers 158, 160. The retainer 160 extends into the cavity 150 and away from an inner wall 161 within the cavity 150. The retainer 160, in an installed position such as shown in FIG. 2, abuts the foam portion 156 to hold the foam portion 156 in an innermost position. Similarly, the retainer 158 extends from an inner wall 159 within the cavity 150. The retainers 158, 160 extend generally orthogonally away from the inner walls 159, 161.

In other embodiments, only one retainer is required to hold the foam in place. A single retainer 180 is shown in FIG. 2 within the cavity 170. Before a door panel 174 is installed into the cavity 170, a foam piece 176 is installed into the cavity 170 and past the retainers 180a, 180b. Like the retainers discussed previously, the retainer 180 extends away from an inner wall within the cavity 170 towards a center portion of the cavity 170. The door panel (in all embodiments) abuts the foam portion to prevent air, wind, noise and debris from entering the vehicle. In some embodiments, the door panel mist abut the foam portion to prevent noise intrusion.

Furthermore, a seal 182 is provided extending away from the lip portion 172. The seal 182 is adapted to abut an outer surface 175 of the door panel 174. This seal prevents water or other elements from entering the cavity 170.

The weather strip 120 as illustrated in FIG. 2 is adapted to accept a portion of a window 122 having a distal end 124. The distal end is adapted to abut an interior portion 126 of the weather strip 120. The window is adapted to move into the weather strip between the lips 128, 130. The lips 128, 130 are adapted to flex to accept the window 120 as it is installed. The lips 128, 130 extend away from the main body portions 132, 134. Cavities 136, 138 are provided between the main body portions 132, 134 and the lips 128, 130. In alternative embodiments, the retainers such as discussed above may also be installed or molded within the cavities 136, 138 to mechanically secure additional insulation foam within the cavities 136, 138.

The weather strip 120 further includes a sealing lip 184 adapted to abut the door frame 154 when in the installed position. The sealing lip 184 is adapted to seal out water and other elements from entering the cavity.

A weather strip 220 is installed in the door frame 104 within the side portion 106, such as illustrated in FIG. 3. The weather strip 220 is adapted to connect with the window 122. As a distal end 224 of the window 122 enters the weather strip 120, lip portions 228, 230 are adapted to flex to accept the window 122. Main body portions 234, 232 include lip portions 228, 230 extending away from the main body portions 234, 232. The space between the main body portions 232, 234 and the lip portions 228, 230 creates a set of cavities 236, 238. It should be appreciated that the retainers and foam discussed within this application may also be provided within the cavities 236, 238.

The weather strip 220 of FIG. 3 includes the main body 232 having a lip 252 extending therefrom. The space between the main body 232 and the lip 252 creates a cavity 250. The cavity 250 is adapted to accept a portion of the door frame 254. A lip seal 231 is provided to rest adjacent to the door panel 254 to seal the cavity 250. Before the door panel 254 is installed into the door cavity 250, a foam portion 256 is installed into the cavity 250. The foam portion 256 is held into place by means of retainers 258, 260. The retainers extend away from inner surfaces 261, 259. In this embodiment, the retainers 258, 260 at least partially abut the foam portion 256. The retainers 258, 260 are adapted to exert a force against the foam to hold the foam portion 256 in place within the cavity 250.

Similarly, a foam portion 276 is held into place by means of retainers 280, 282. A lip portion 272 extends away from the main body portion 232 of the weather strip 220. Before the door panel 272 is installed into the cavity 270, the foam portion 276 is inserted into the cavity 270 and past the retainers 280, 282.

The weather strip 220 as illustrated in FIG. 3 is mounted to both a glass guide 262 and the door panel 254. The door panel 254 connects with the glass guide 262 at crimped edges 208 and 209. The glass guide 262 includes bent edges 264, 266 and is adapted to accommodate a main portion of the weather strip 220.

The weather strip further includes a main inner cavity 269 adapted to accept the distal end 224 of the window 122. The inner cavity 269 of the weather strip 220 includes the abutting portion 268 adapted to rest against the distal end 224 of the window 122.

A lip seal 283 may further be provided connected to either the main body portion 234 or the lip 272. In the present embodiment, the lip seal 283 is connected to the main body portion 234 and extends away from the main body portion 234 to abut and rest adjacent to the glass guide 262. The lip seal 283 is adapted to seal the cavity 270 from water and other elements.

The foam portion is a dry foam (i.e. not having any adhesive required for installation). The foam portion used in connection with the weather strip may be any dry foam made of any sponge-like material made from any plastic, plastic-like polymer, polymer-like, or other similar material suitable for creating a foam or sponge-like material. Furthermore, the foam portion may include a wire or other fiber contained within a center portion of the foam to prevent the foam from stretching. Wire is defined as any fiber or other suitable material in an elongated form extending the length or at least a portion of the length of the foam. The wire is coextruded with the foam. The wire 296, in the present embodiment, is provided generally centrally within the foam. However, in other embodiments, the foam may be provided at an outer edge or anywhere else within the foam to prevent the foam from stretching during installation and in use.

Figures 4, 5:
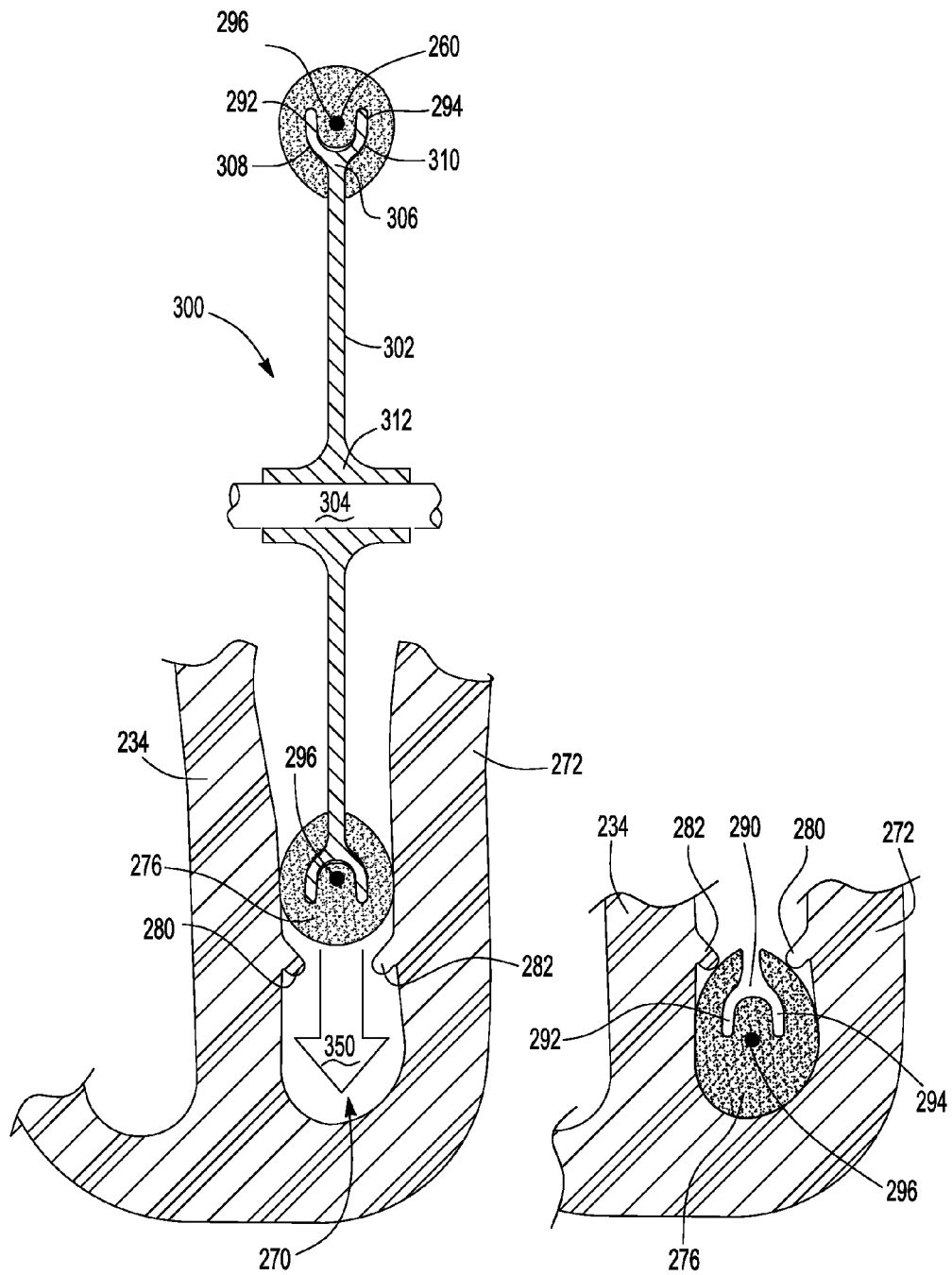
FIG. 4 illustrates a tool for installing the foam into the cavity of the weather strips having two retainers.
FIG. 5 illustrates a cross-sectional view of the installed foam within the cavity of the weather strip.

An installation tool 300 is illustrated in FIGS. 4 and 6 for installing the foam portions 156, 176, 256, 276 into a cavity within a weather strip. In the embodiment as shown in FIG. 4, the foam portion 276 includes the wire 296. The installation tool 300 includes a wheel 302 having an outer peripheral edge 306 having structure adapted to accommodate the geometry of the foam portion 276. In the present embodiment, the outer peripheral edge 306 of the wheel 302 includes prongs 308, 310 adapted to connect with the apertures 292 of the foam portion 276. The prongs 294 of the wheel 302 extend along the entire outer peripheral edge of the wheel 302. This structure allows a constant supply of foam portion 276 from a supply reel 332 to be installed into the weather strip at any given time. As the wheel 302 rotates 330 in a forward direction as illustrated by directional arrow 340, the weather strip is pushed past the retainers 280, 282 into a final installed position. The wheel 302 is adapted to rotate about a main pivot point 304. The wheel may include a connection point 312 allowing the wheel 302 to rotate about the main pivot 304.

The prongs 294 are adapted to create a secure connection between the installation tool 300 and the foam portion 276. Other configurations providing for a secure connection between the wheel and the foam should also be appreciated. As the foam portion 276 is pushed into the cavity 270 and past the retainers 280, 282, the retainers 280, 282 may flex and bend to accommodate the passing foam portion 276.

Once in an installed position, such as shown in FIG. 5, the retainers 280, 282 may at least partially abut a portion of the foam portion 276. In the present embodiment, the retainers 280, 282 include rounded distal ends adapted to abut the foam portion 276. In other embodiments, the foam may abut a side wall of the retainers 280, 282.

The weather strip as discussed above is made from a thermoplastic vulcanisate (TPV). The weather strip as discussed may also be made of any plastic, plastic-like, polymer, or polymer-like, or similar suitable material. The foam portion as discussed above is separate and different from the weather strip. Typically, the foam portion and the weather strip are made from different materials. Furthermore, the retainers as discussed in this application may be integrally formed with the remainder of the weather strip. More specifically, the retainer may be integrally formed and molded with the lip portion or main body portion of the weather strip. The weather strip is extruded thus allowing the retainers to be extruded with the remainder of the weather strip.

The invention is not restricted to the illustrative examples and embodiments described above. The embodiments are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the appended claims.

We claim:

1. A weather strip adapted to connect to a door frame and a window, the weather strip comprising:
   a main body, the main body configured to accept a portion of the window;
   a lip extending away from the main body, the lip adapted to connect with the door frame;
   a cavity formed between the main body and the lip; and
   a foam portion mounted within the cavity, the foam portion held in the cavity by at least one retainer extending into and towards the cavity, the foam portion comprising a foam portion cavity having spaced-apart apertures, wherein the foam portion cavity is configured to securely connect to an installation tool having two prongs that are received by the spaced-apart apertures.

2. The weather strip of claim 1 wherein the retainer extends generally orthogonally into the cavity with respect to an inner wall of the cavity.

3. The weather strip of claim 1 wherein the retainer extends into the cavity and towards the foam portion when in an installed position.

4. The weather strip of claim 1 wherein the retainer is flexible to accommodate the foam portion when in an installed position.

5. The weather strip of claim 1 wherein the retainer is integrated into at least one of the main body and the lip.

6. The weather strip of claim 1 wherein the retainer, the lip and the main body are a one piece assembly.

7. The weather strip of claim 1 wherein the retainer has a rounded distal end.

8. The weather strip of claim 7 wherein the distal end of the retainer at least partially abuts the foam when the foam is in an installed position.

9. The weather strip of claim 1 wherein a side portion of the retainer at least partially abuts the foam when the foam is in an installed position.

10. The weather strip of claim 1 wherein the foam includes a central wire support co-extruded with the foam.

11. The weather strip of claim 10 wherein spaced-apart apertures extend on opposite sides of the central wire.

12. The weather strip of claim 11 wherein the foam includes a cavity having geometry corresponding to the installation tool.

13. A door assembly for a vehicle comprising:
   a door frame;
   a window contained within the door frame;
   a weather strip mounted between the door frame and the window, the weather strip having a cavity; and
   a foam portion mounted within the cavity, the foam portion held in the cavity by a retainer extending into and towards the cavity, the foam portion comprising a foam portion cavity having spaced-apart apertures, wherein the foam portion cavity is configured to securely connect to an installation tool having two prongs that are received by the spaced-apart apertures.

14. The door assembly of claim 13 wherein the retainer is provided within the cavity to mechanically secure the foam portion within the cavity, the retainer extending from an inner wall within the cavity.

15. The door assembly of claim 14 wherein the retainer extends generally orthogonally into the cavity with respect to an inner wall of the cavity.

16. The door assembly of claim 14 wherein the retainer extends into the cavity and towards the foam portion when in an installed position.

17. The door assembly of claim 14 wherein the retainer is flexible to accommodate the foam portion when in an installed position.

18. The door assembly of claim 14 wherein the retainer is integrated into at least one of a main body or a lip.

19. The door assembly of claim 14 wherein the retainer and the weather strip are a one piece assembly.

20. The door assembly of claim 14 wherein the retainer has a rounded distal end.

* * * * *